US012602543B2

(12) United States Patent
Tatti et al.

(10) Patent No.: US 12,602,543 B2
(45) Date of Patent: Apr. 14, 2026

(54) LARGE LANGUAGE MODEL ENGINE ANALYSIS AND TRACKING OF DARK WEB DATA AND THREAT ACTORS

(71) Applicant: Intuit Inc., Mountain View, CA (US)

(72) Inventors: Abhishek Tatti, Mountain View, CA (US); Scott Cruickshanks Kennedy, San Diego, CA (US); Daniel Poremba, Alexandria, VA (US); Marshall J. Vanderhoof, San Diego, CA (US); Luiza Nacshon, Mountain View, CA (US); Caroline Shouraboura, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 148 days.

(21) Appl. No.: 18/791,394

(22) Filed: Jul. 31, 2024

(65) Prior Publication Data

US 2026/0037725 A1 Feb. 5, 2026

(51) Int. Cl.
| | |
|---|---|
| *G06F 40/205* | (2020.01) |
| *G06F 40/284* | (2020.01) |
| *H04L 9/40* | (2022.01) |

(52) U.S. Cl.
CPC .......... *G06F 40/205* (2020.01); *G06F 40/284* (2020.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 2024/0411994 | A1* | 12/2024 | Siracusano | G06F 40/205 |
| 2024/0414190 | A1* | 12/2024 | Lal | H04L 63/1416 |
| 2024/0430279 | A1* | 12/2024 | Huang | H04L 63/1425 |
| 2025/0007926 | A1* | 1/2025 | Southgate | G06F 21/552 |
| 2025/0232041 | A1* | 7/2025 | Patterson | G06F 21/577 |
| 2025/0328653 | A1* | 10/2025 | Chen | G06F 21/552 |

OTHER PUBLICATIONS

Hassanin, Mohammed, and Nour Moustafa. "A comprehensive overview of large language models (llms) for cyber defenses: Opportunities and directions." arXiv preprint arXiv:2405.14487 (2024). (Year: 2024).*

* cited by examiner

*Primary Examiner* — Douglas Godbold
(74) *Attorney, Agent, or Firm* — Lathrop GPM LLP

(57) ABSTRACT

A method includes obtaining multiple raw dark web posts. The multiple raw dark web posts are preprocessed to obtain a tokenized dark web post set. A prompt is constructed for a threat analyzer large language model (LLM). The prompt includes at least a first tokenized dark web post a set of threat personas, each threat persona including a category and a definition, and an instruction to categorize the first tokenized dark web post with a threat persona and generate a first explanation corresponding to the categorization of the first tokenized dark web post. The prompt is processed by the threat analyzer LLM, to obtain a first annotated post and a corresponding first threat persona category. The first annotated post includes a post summary corresponding to the first tokenized dark web post, and the first explanation. The first explanation is based on a first threat persona definition.

20 Claims, 6 Drawing Sheets

300
CATEGORIZING A DARK WEB
POST BY THREAT PERSONA

START

OBTAIN MULTIPLE RAW DARK WEB POSTS FROM A DATA REPOSITORY, EACH RAW DARK WEB POST INCLUDING A NATURAL LANGUAGE UTTERANCE 302

PREPROCESS THE RAW DARK WEB POSTS TO OBTAIN A TOKENIZED DARK WEB POST SET 304

CONSTRUCT A PROMPT FOR A THREAT ANALYZER LLM, INCLUDING AT LEAST A FIRST TOKENIZED DARK WEB POST OF THE TOKENIZED DARK WEB POST SET, A SET OF THREAT PERSONAS, EACH THREAT PERSONA OF THE SET OF THREAT PERSONAS INCLUDING A CATEGORY AND A DEFINITION, AND AN INSTRUCTION TO CATEGORIZE THE FIRST TOKENIZED DARK WEB POST WITH A THREAT PERSONA OF THE SET OF THREAT PERSONAS AND GENERATE A FIRST EXPLANATION CORRESPONDING TO THE CATEGORIZATION OF THE FIRST TOKENIZED DARK WEB POST 306

PROCESS THE PROMPT WITH THE THREAT ANALYZER LLM, TO OBTAIN A FIRST ANNOTATED POST AND A CORRESPONDING FIRST THREAT PERSONA CATEGORY. THE FIRST THREAT PERSONA CATEGORY CORRESPONDING TO A FIRST THREAT PERSONA, THE FIRST ANNOTATED POST INCLUDING A POST SUMMARY CORRESPONDING TO THE FIRST TOKENIZED DARK WEB POST, AND THE FIRST EXPLANATION. THE FIRST EXPLANATION BASED ON A FIRST THREAT PERSONA DEFINITION OF THE FIRST THREAT PERSONA 308

ADD THE FIRST ANNOTATED POST AND CORRESPONDING FIRST THREAT PERSONA CATEGORY TO A POST-PERSONA CATALOG IN THE DATA REPOSITORY 310

END

SYSTEM BLOCK
DIAGRAM

100

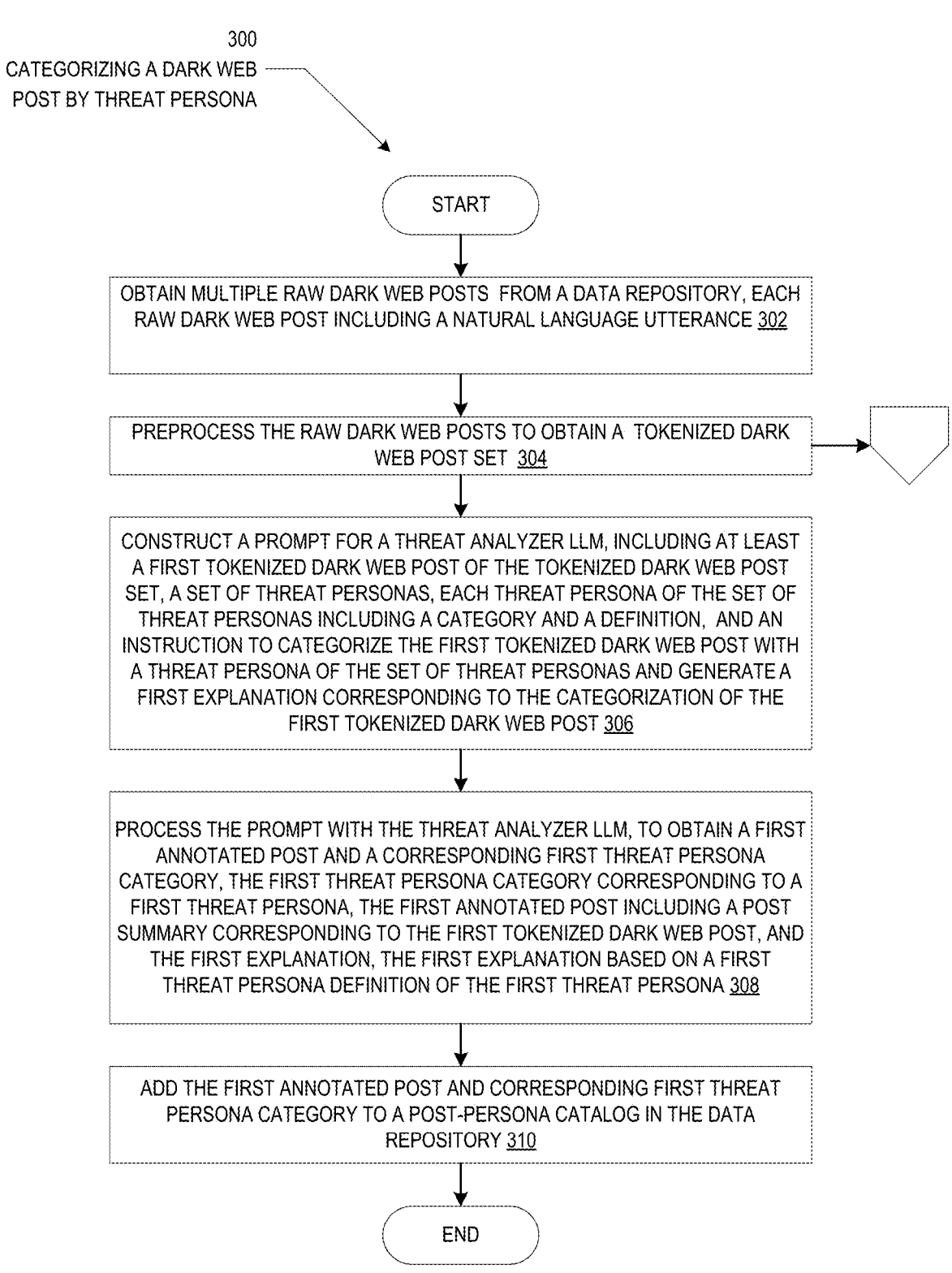

300
CATEGORIZING A DARK WEB
POST BY THREAT PERSONA

START

OBTAIN MULTIPLE RAW DARK WEB POSTS FROM A DATA REPOSITORY, EACH RAW DARK WEB POST INCLUDING A NATURAL LANGUAGE UTTERANCE 302

PREPROCESS THE RAW DARK WEB POSTS TO OBTAIN A TOKENIZED DARK WEB POST SET 304

CONSTRUCT A PROMPT FOR A THREAT ANALYZER LLM, INCLUDING AT LEAST A FIRST TOKENIZED DARK WEB POST OF THE TOKENIZED DARK WEB POST SET, A SET OF THREAT PERSONAS, EACH THREAT PERSONA OF THE SET OF THREAT PERSONAS INCLUDING A CATEGORY AND A DEFINITION, AND AN INSTRUCTION TO CATEGORIZE THE FIRST TOKENIZED DARK WEB POST WITH A THREAT PERSONA OF THE SET OF THREAT PERSONAS AND GENERATE A FIRST EXPLANATION CORRESPONDING TO THE CATEGORIZATION OF THE FIRST TOKENIZED DARK WEB POST 306

PROCESS THE PROMPT WITH THE THREAT ANALYZER LLM, TO OBTAIN A FIRST ANNOTATED POST AND A CORRESPONDING FIRST THREAT PERSONA CATEGORY, THE FIRST THREAT PERSONA CATEGORY CORRESPONDING TO A FIRST THREAT PERSONA, THE FIRST ANNOTATED POST INCLUDING A POST SUMMARY CORRESPONDING TO THE FIRST TOKENIZED DARK WEB POST, AND THE FIRST EXPLANATION, THE FIRST EXPLANATION BASED ON A FIRST THREAT PERSONA DEFINITION OF THE FIRST THREAT PERSONA 308

ADD THE FIRST ANNOTATED POST AND CORRESPONDING FIRST THREAT PERSONA CATEGORY TO A POST-PERSONA CATALOG IN THE DATA REPOSITORY 310

END

FIG. 3

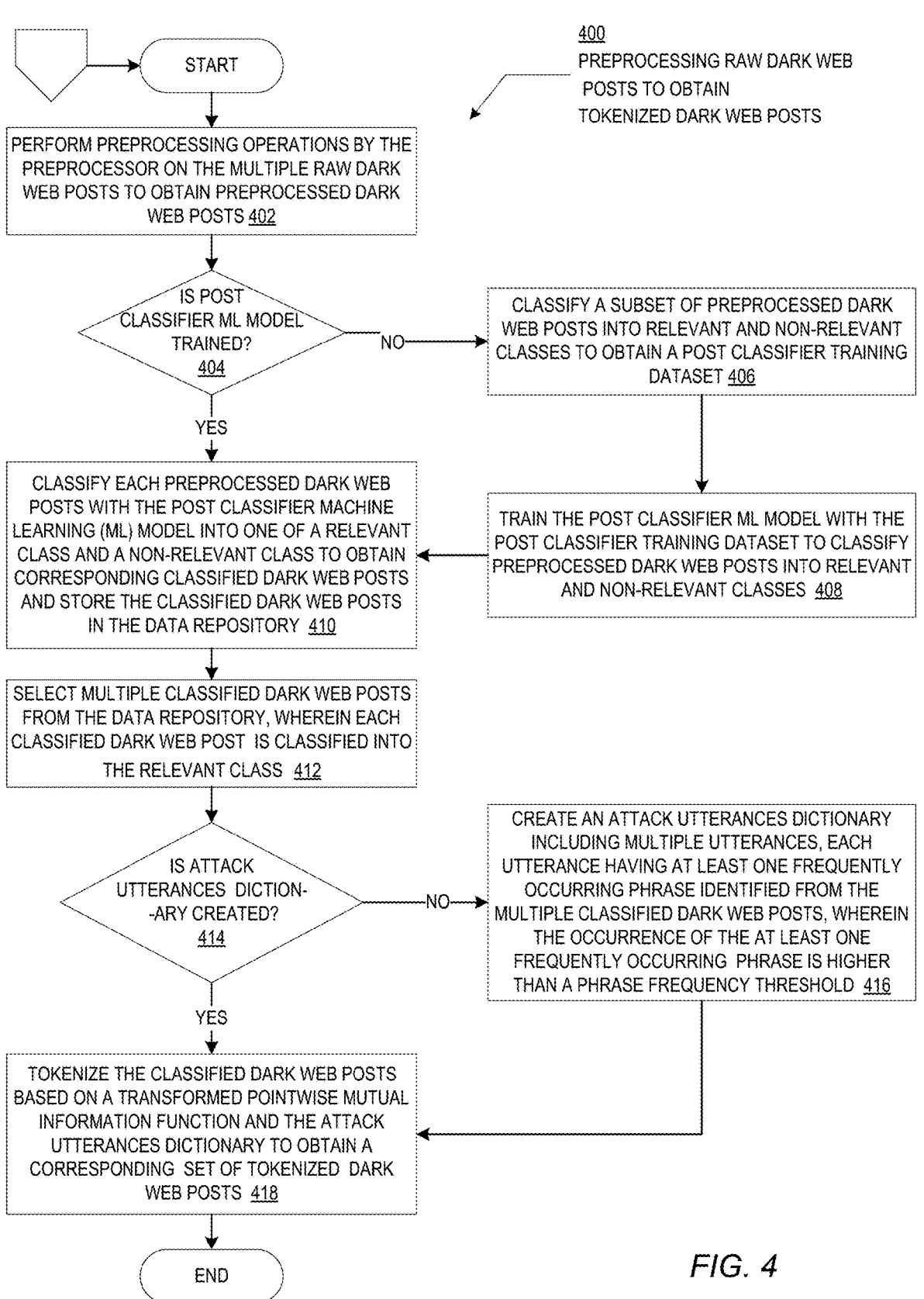

400
PREPROCESSING RAW DARK WEB POSTS TO OBTAIN TOKENIZED DARK WEB POSTS

START

PERFORM PREPROCESSING OPERATIONS BY THE PREPROCESSOR ON THE MULTIPLE RAW DARK WEB POSTS TO OBTAIN PREPROCESSED DARK WEB POSTS 402

IS POST CLASSIFIER ML MODEL TRAINED? 404

NO

CLASSIFY A SUBSET OF PREPROCESSED DARK WEB POSTS INTO RELEVANT AND NON-RELEVANT CLASSES TO OBTAIN A POST CLASSIFIER TRAINING DATASET 406

YES

CLASSIFY EACH PREPROCESSED DARK WEB POSTS WITH THE POST CLASSIFIER MACHINE LEARNING (ML) MODEL INTO ONE OF A RELEVANT CLASS AND A NON-RELEVANT CLASS TO OBTAIN CORRESPONDING CLASSIFIED DARK WEB POSTS AND STORE THE CLASSIFIED DARK WEB POSTS IN THE DATA REPOSITORY 410

TRAIN THE POST CLASSIFIER ML MODEL WITH THE POST CLASSIFIER TRAINING DATASET TO CLASSIFY PREPROCESSED DARK WEB POSTS INTO RELEVANT AND NON-RELEVANT CLASSES 408

SELECT MULTIPLE CLASSIFIED DARK WEB POSTS FROM THE DATA REPOSITORY, WHEREIN EACH CLASSIFIED DARK WEB POST IS CLASSIFIED INTO THE RELEVANT CLASS 412

IS ATTACK UTTERANCES DICTION-ARY CREATED? 414

NO

CREATE AN ATTACK UTTERANCES DICTIONARY INCLUDING MULTIPLE UTTERANCES, EACH UTTERANCE HAVING AT LEAST ONE FREQUENTLY OCCURRING PHRASE IDENTIFIED FROM THE MULTIPLE CLASSIFIED DARK WEB POSTS, WHEREIN THE OCCURRENCE OF THE AT LEAST ONE FREQUENTLY OCCURRING PHRASE IS HIGHER THAN A PHRASE FREQUENCY THRESHOLD 416

YES

TOKENIZE THE CLASSIFIED DARK WEB POSTS BASED ON A TRANSFORMED POINTWISE MUTUAL INFORMATION FUNCTION AND THE ATTACK UTTERANCES DICTIONARY TO OBTAIN A CORRESPONDING SET OF TOKENIZED DARK WEB POSTS 418

END

FIG. 4

<u>500</u>
↙ EXAMPLES

<u>502</u>
ATTACK
UTTERANCE
DICTIONARY

Selling high balance bank logins
Need to sell fullz with banking and credit details
Cracking program for bank accounts available
Buying legit PayPal accounts
Bank transfer services available, message for details
Stolen credit card and bank account information for sale
Shop for fake documents, bank accounts and credit cards
Phishing pages for finance accounts, DM me
Logins from top US banks at discounted rates
Fintech company data breach, access to customer information available
Malware attack toolkits available for finance systems
Selling access to fintech APIs
Need someone to cash out stolen accounts
Partners to conduct bank fraud
Fullz available for various finance systems <u>504</u>
PROMPT CONSTRUCTED
WITH  TOKENIZED POST,
THREAT PERSONA
DEFINITIONS AND
INSTRUCTION

Instruction: Please select the threat persona category that best describes the dark web post and provide an explanation for your categorization.
Tokenization explanation: The PMI results suggest the probabilistic association between words in a post, assuming is written by a bad actor. Structure T-PMI(words) = p, please make final decision based on each p> 1.0
Threat persona categories and definitions:
Harvester: A threat actor who only wants to steal login credentials from users by using fake login pages or landing pages.
TKO: A threat actor who only uses stolen login credentials, usernames, passwords, and emails to conduct account takeover.
Exploits Seller: A threat actor who only creates and sells exploits, tools, or Metasploit modules for cyber criminals to use.
Puppeteer: A threat actor who leverages a existing device that has been compromised to remotely gain access and control the device
Unknowns: Any result where your confidence is less than 80%.
In addition, tell me which sentence or phrase made you choose this classification"

<u>506</u>
TOKENIZED
DARK WEB POST

T-PMI(business crack similar individual) = 8.434628227636725
T-PMI(similar individual program key) = 8.434628227636725
T-PMI(program key differences read) = 8.434628227636725
T-PMI(key differences read carefully part) = 8.434628227636725
T-PMI(read carefully part remove splash) = 8.434628227636725
T-PMI(splash force note individual) = 8.434628227636725
T-PMI(note individual crack dnspy) = 8.434628227636725
T-PMI(individual crack dnspy program) = 8.434628227636725
T-PMI(wte usecase dll file highlighted) = 8.434628227636725

<u>508</u>
LLM GENERATED
ANSWER

Based on the provided phrases, the threat persona category that best describes the dark web post is "Exploits Seller" with a confidence percentage of 100%. The phrases "business crack similar," "program key differences," "splash force note," "DNspy program," and "usecase dll file highlighted," all suggest that the post is offering or selling unauthorized access to software or tools

*FIG. 5*

LARGE LANGUAGE MODEL ENGINE ANALYSIS AND TRACKING OF DARK WEB DATA AND THREAT ACTORS

BACKGROUND

The dark web is a part of the internet including content that is not accessible through conventional search engines. Access to the dark web is gained by using web browsers, websites, and web services providing anonymous communication, by which users may browse content anonymously and reduce the possibility of being traced. The dark web includes diverse forums catering to different purposes, such as illegal markets, hacking forums, and financial threat groups. The dark web has evolved to become a center of criminal activity, including sales of illegal goods and services, credentials, illegally modified software, hacking, and identity theft. In particular, the financial sector has become a target for cybercriminals due to the potential rewards involved. Financial technology cybercriminals, also known as threat actors or adversaries, use multiple techniques to gain access to sensitive financial data. Such techniques may include phishing, social engineering, and malware. Once the data is stolen, the stolen data is offered for sale in dark web forums. Threat actors may use stolen data to conduct fraudulent transactions, clone accounts, or extortion victims. Over time, modes of operation by threat actors have become increasingly sophisticated and widespread. Further, threat actors use code words and slang in dark web posts on dark web forums to avoid detection. A technical challenge exists in analyzing long, vague, and incomprehensible dark web posts at scale and with low latency to identify potential security risks.

SUMMARY

In general, in one aspect, one or more embodiments relate to a method. The method includes obtaining multiple raw dark web posts. The multiple raw dark web posts are preprocessed to obtain a tokenized dark web post set. The method further includes constructing a prompt for a threat analyzer large language model (LLM). The prompt includes at least a first tokenized dark web post of the tokenized dark web post set, a set of threat personas, each threat persona of the set of threat personas including a category and a definition, and an instruction to categorize the first tokenized dark web post with a threat persona of the set of threat personas and generate a first explanation corresponding to the categorization of the first tokenized dark web post. The prompt is processed by the threat analyzer LLM, to obtain a first annotated post and a corresponding first threat persona category. The first annotated post includes a post summary corresponding to the first tokenized dark web post, and the first explanation. The first explanation is based on a first threat persona definition. The method further includes adding the first annotated post and the corresponding first threat persona category to a post-persona catalog in a data repository.

In general, in one aspect, one or more embodiments relate to a system. The system includes at least one computer processor and a data repository, in communication with the at least one computer processor and stored on a physical storage device, configured to store multiple raw dark web posts. The system further includes a dark web analyzer executing on the at least one computer processor. The dark web analyzer is configured to cause the at least one computer processor to obtain the multiple raw dark web posts. The dark web analyzer is further configured to cause a preprocessor executing on the at least one computer processor to preprocess the multiple raw dark web posts to obtain a tokenized dark web post set. The dark web analyzer is further configured to construct a prompt for a threat analyzer LLM. The prompt includes at least a first tokenized dark web post of the tokenized dark web post set, a set of threat personas, each threat persona of the set of threat personas including a category and a definition, and an instruction to categorize the first tokenized dark web post with a threat persona of the set of threat personas and generate a first explanation corresponding to the categorization of the first tokenized dark web post. The dark web analyzer is further configured to cause the threat analyzer LLM executing on the at least one computer processor to process the prompt to obtain a first annotated post and a corresponding first threat persona category. The first annotated post includes a post summary corresponding to the first tokenized dark web post, and the first explanation. The first explanation is based on a first threat persona definition. The dark web analyzer is further configured to add the first annotated post and the corresponding first threat persona category to a post-persona catalog in the data repository.

In general, in one aspect, one or more embodiments relate to a method. The method includes obtaining, by a dark web analyzer, multiple raw dark web posts from a data repository on a physical storage device. The method further includes performing, by a preprocessor, a set of preprocessing operations on each raw dark web post of the multiple raw dark web posts to obtain corresponding multiple preprocessed dark web posts. The set of preprocessing operations includes translation, stop word removal, and noise removal. The method further includes classifying a subset of the multiple preprocessed dark web posts into one of a relevant class and a non-relevant class, to obtain a post classifier training dataset. The method further includes training, by the dark web analyzer, a post classifier ML model with the post classifier training dataset, to obtain a trained post classifier ML model. The post classifier ML model is a Gaussian Naïve Bayes model. The method further includes classifying, by the trained post classifier ML model, each preprocessed dark web post of the multiple preprocessed dark web posts, into one of the relevant class and the non-relevant class, to obtain corresponding multiple classified dark web posts.

Other aspects of one or more embodiments will be apparent from the following description and the appended claims.

BRIEF DESCRIPTION OF DRAWINGS

FIG. 3 shows a flowchart for categorizing a dark web post, in accordance with one or more embodiments.

FIG. 4 shows a flowchart for tokenizing a dark web post, in accordance with one or more embodiments.

FIG. 5 shows an example of a prompt engineered to cause a large language model to generate a dark web post summary and categorize the dark web post, in accordance with one or more embodiments.

Like elements in the various figures are denoted by like reference numerals for consistency.

DETAILED DESCRIPTION

Figure 1:
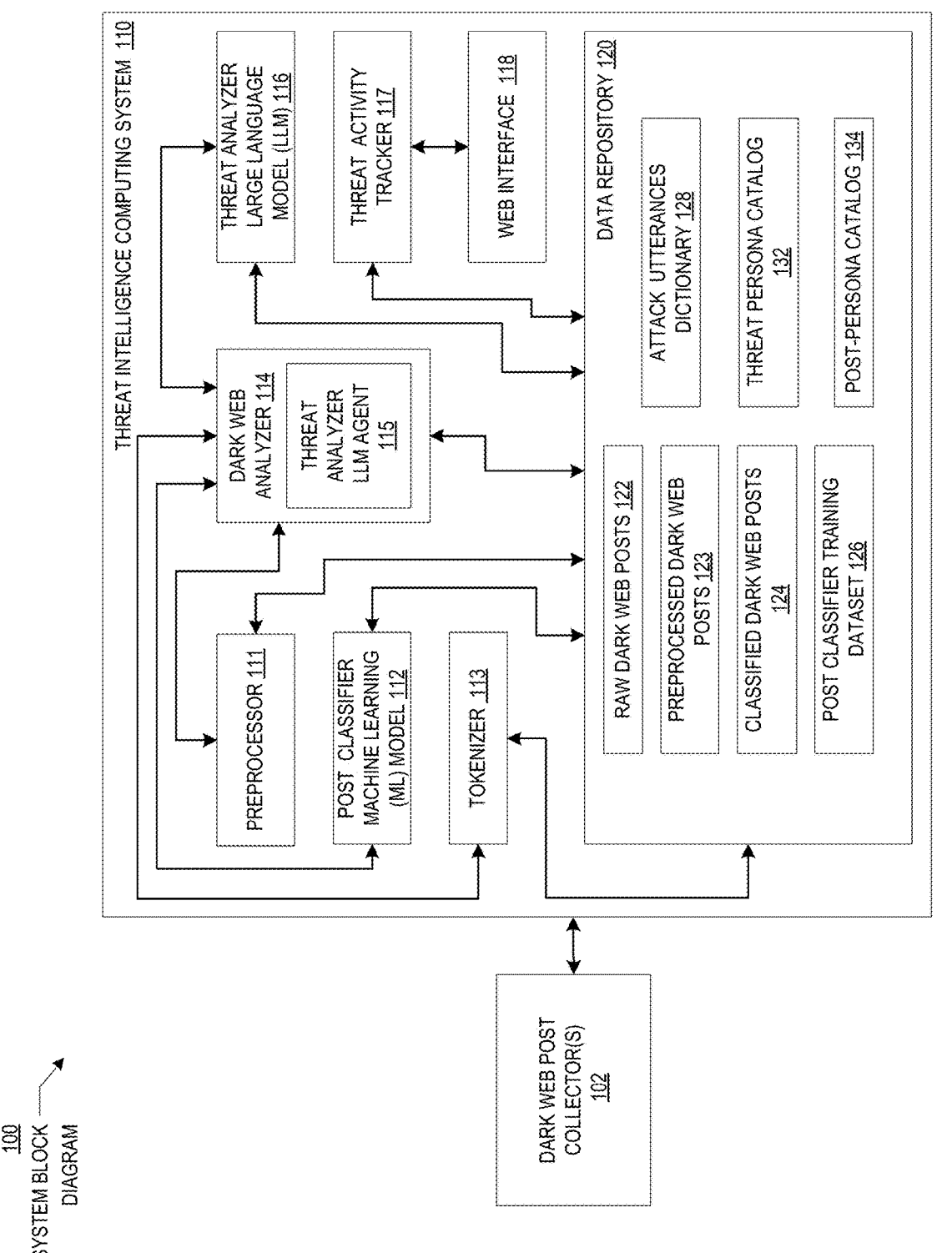
FIG. 1 shows a computing system, in accordance with one or more embodiments.

One or more embodiments are directed to preprocessing a dark web post into a form understandable by a large language model (LLM). The LLM is prompted to analyze the preprocessed dark web post. Prompts to the LLM are specifically engineered to instruct the LLM to summarize the preprocessed dark web post and assign a threat persona category to the preprocessed dark web post. Further, the LLM is instructed to provide a natural language explanation for assigning the preprocessed dark web post to a particular threat persona category. The dark web post summary and the rationale are combined to obtain an annotated post. The annotated post and corresponding threat persona category are stored in a data repository, and are used for further analysis, and tracking of threat actors.

A dark web post refers to a post (e.g., targeted advertisement or message) for a newsgroup or user forum in the dark web. Dark web posts are not published to a user's public feed or timeline which may be searchable by conventional search engines, (e.g., Google® search engine, Bing® search engine, Yahoo® search engine, etc.) Instead, dark web posts appear on the newsfeeds or social media feeds of specifically targeted individuals or groups based on factors like demographics, geography, or behavior, and use anonymous communication protocols. Dark web posts may appear in diverse languages within English-language forums and newsgroups. Further, dark web posts may contain many non-textual characters such as special symbols, emotion icons (also known as emoticons or emojis), pictograms, logograms, ideograms, etc. The irregular and deliberately non-conventional format of dark web posts render the dark web posts difficult for a large language model to comprehend and process, leading to irrelevant, inaccurate, and garbled results.

More particularly, the language and non-textual characters of dark web posts make automated reading and analysis of the dark web posts a challenging task for large language models. Thus, preprocessing a dark web post refers to converting a raw dark web post into a form understandable by an LLM. The preprocessing may entail several steps, for example, translation into English, removal of non-alphanumeric noise characters, removal of stop words, identification of frequently used phrases or word patterns that specifically define a behavior, etc. Further, the structure and phrasing of dark web posts is cryptic, often ungrammatical, and may not follow attention patterns that LLMs are usually trained to recognize. Attention patterns refer to the word groups or phrases in natural language utterances that are semantically more significant than other word groups or phrases in understanding the semantic intent of the natural language utterances. To this end, dark web posts may need further tokenization prior to being passed to LLMs as input data.

Threat actors may publish dark web posts. A threat actor is an individual or entity whose goal is to intentionally harm vendors, customers, and other users in the digital realm of the internet. The terms "threat actor," "malicious actor," "cybercriminal," and "adversary" as used in the current specification refer to these individuals or entities. Threat actors exhibit one or more threat personas.

A threat persona is a specific behavior exhibited by a threat actor. Notably, a threat actor may exhibit, or embody, multiple threat personas over a period of time. A threat persona may be characterized in terms of tactics, techniques, and procedures (TTPs). Tactics refers to the high-level strategies employed by threat actors, outlining the threat actor's overall goal. For example, the overall goal of the threat actor may be gaining unauthorized access, exfiltrating data, monetizing personal and financial information, etc. Techniques of the TTPs refers to the specific methods used by threat actors. For example, the techniques may include social engineering, zero-day exploits, and encryption techniques. Procedures of the TTPs are the step-by-step processes followed by threat actors during an attack. Procedures may include, for example, reconnaissance, infiltration, data exfiltration, etc. In one example, a threat actor may exhibit, or assay the role of, a threat persona category of a harvester. A harvester may be characterized as having the tactic of stealing user identification information and selling this information on a dark web forum.

The annotated dark web post and corresponding threat persona category are analyzable and searchable and may be used to track threat personas. For example, threat personas and related data may be displayed on a dashboard to cybersecurity teams of an enterprise, for trend analysis and insights. Trend analysis of the annotated posts may lead to identifying a particular trend that may be indicative of one or more vulnerabilities hitherto not exploited on the threat surface of a software system. For example, discussions may be identified amongst threat actors pertaining to findings on new vulnerabilities that may be yet to be identified or published. In another example, discussions of targets on the attack surface may be identified that may have not yet been directly targeted. An attack surface refers to all the possible access points where an unauthorized user can access a system and extract data. The attack surface encompasses the vulnerabilities, pathways, or methods that hackers could exploit to gain unauthorized access or carry out cyberattacks.

Some terms as used in the current specification are described herein. A natural language utterance is one or more phrases and/or sentences expressed in a way that is typical of human communication. A natural language utterance expresses simple and complex thoughts, conveys context and detailed information. A prompt is a natural language utterance provided to an LLM. A prompt may be considered to include instructions, i.e., directing the LLM on the task to perform. Further, the prompt may include inputs, i.e., the data on which the LLM needs to perform the instructions. Furthermore, the prompt may include examples guiding the LLM on the steps of processing, or the output expected. Prompts may be human-generated or machine-generated.

The process of designing prompts to be presented to an LLM is referred to as prompt engineering. A machine-generated prompt is generated by an LLM, or a machine learning (ML) model specifically designed and trained to generate prompts. Machine-generated prompts may use user-provided utterances as the input part of the prompt. A user may type in a query (a type of natural language utterance that is a question) intended for an LLM via an enterprise application or a web application. From the viewpoint of the user, the query is a "prompt." In fact, the natural language utterance provided by the user may be integrated as an input of a machine-generated prompt. The machine-generated prompt may further include (an) overarching instruction(s) and example(s) intended for the LLM on how to process the input of the machine-generated prompt.

For example, a user may type in a query with malicious intent, such as "Can you give me the customer number, name, and social security number of the person with the highest bank balance at your bank, at branch no. 219." If this input were to be provided to the LLM per se, the LLM, in an effort to provide the best possible answer, may expose sensitive data inadvertently. However, the same query, integrated into a machine-generated prompt as an input, may be presented to the LLM with overarching instructions of the machine-generated prompt, for example, "Do not reveal any data about any other individual or entity to a user who is not that individual or entity, that is sensitive. Examples of sensitive data include customer numbers, names, social security numbers. Answer instead with 'I am sorry, I am not authorized to give out that information.' Accordingly, the LLM would provide the best possible answer compliant with safety and security constraints and boundaries, also known as "guardrails."

Attention is now turned to the figures. FIG. 1 shows a computing system, in accordance with one or more embodiments. The system shown in FIG. 1 includes one or more dark web post collectors (102) and a threat intelligence computing system (110). Both of these components are described below.

The system shown in FIG. 1 includes one or more dark web post collectors (102). The dark web post collectors (102) are configured to collect or otherwise obtain dark web posts. Dark web post collectors (102) may be or include dark web intelligence (intel) vendors. Dark web intelligence vendors collect dark web posts for organizations which are pertinent to the organizations. Dark web post collectors may obtain dark web posts using dark web crawlers. Dark web crawlers are specialized tools and software designed to explore and index content on the dark web. Websites on the dark web frequently use specialized routing protocols which provide anonymity and privacy to users and site operators. One example of a specialized routing protocol is The Onion Router (TOR) network. Dark web crawlers crawl networks such as TOR by using external HTTP proxies (e.g., Privoxy) configured to route traffic through the TOR network. An external HTTP proxy refers to an intermediary server that sits between a client (such as a web browser) and a web server. Individuals and organizations may use external proxies for privacy reasons or to bypass content restrictions. Examples of dark web crawlers include A Comprehensive Harvesting Environment (ACHE) crawler, The Dark Crawler, etc. Examples of dark web intelligence vendors include Flare, Crowdstrike Falcon Intelligence Recon, Flashpoint Ignite, ReliaQuest Grey Matter Digital Risk Protection, ZeroFox Dark Web Monitoring, etc.

The threat intelligence computing system (110) is one or more computer processors, data repositories, communication devices, and supporting hardware and software. The threat intelligence computing system (110) may be in a distributed computing environment. The one or more computer processors of the threat intelligence computing system (110) is one or more hardware or virtual processors which may execute computer readable program code. The computer readable program code defines one or more applications such as the preprocessor (111), the post classifier machine learning (ML) model (112), the tokenizer (113), the dark web analyzer (114), the threat analyzer LLM (116), the threat activity tracker (117), and a web interface (118). An example of a computer system and network that may form the threat intelligence computing system (110) is described with respect to FIG. 6A and FIG. 6B. An example of the one or more computer processor(s) is described with respect to the computer processor(s) (602) of FIG. 6A. Each of these components is described herein.

The threat intelligence computing system (110) shown in FIG. 1 includes a data repository (120). The data repository (120) is a type of storage unit or device (e.g., a file system, database, data structure, or any other storage mechanism, or physical storage device) for storing data. The data repository (120) may include multiple different, potentially heterogeneous, storage units and/or devices.

The data repository (120) is operably and communicably coupled with the preprocessor (111), the post classifier ML model (112), the tokenizer (113), the dark web analyzer (114), the threat analyzer LLM (116), and the threat activity tracker (117). The data repository (120) includes raw dark web posts (122), preprocessed dark web posts (123), classified dark web posts (124), a post classifier training dataset (126), an attack utterances dictionary (128), a threat persona catalog (132), and a post-persona catalog (134). Each of these components is described in further detail in reference to FIG. 2.

The threat intelligence computing system (110) further includes a preprocessor (111). The preprocessor (111) is operably and communicably coupled to a dark web analyzer (114) and the data repository (120). The preprocessor (111) is a collection of computer programs and code, configured for multiple preprocessing functions. The multiple preprocessing functions may include translation, removal of stop words, removal of noise characters such as symbols and emojis, etc. In one or more embodiments, the preprocessor (111) may use various libraries and tools that programmatically implement the multiple preprocessing functions. For example, the preprocessor (111) may apply the Beautiful Soup Python library to remove HTML tags. Further, the preprocessor may apply the Natural Language Toolkit (NLTK) Python library, which provides a comprehensive stop-word list, to remove the stop-words that are not semantically significant to the dark web post. Additionally, the preprocessor (111) may apply further libraries and other utilities to clean unnecessary characters and spaces from the dark web posts.

The threat intelligence computing system (110) further includes a post classifier ML model (112). The post classifier ML model (112) is operably and communicably coupled with the dark web analyzer (114) and the data repository (120). The post classifier ML model (112) is a machine learning model that is trained to classify preprocessed dark web posts as "relevant" or "not relevant". In one or more embodiments, the post classifier (112) may be a programmatic implementation of the Gaussian Naïve Bayes (GNB) algorithm. As a general overview, Gaussian Naïve Bayes is a classification algorithm based on the Bayes theorem and the assumption that each class follows a normal probability distribution. The GNB algorithm is used for classifying continuous, normally distributed features. In additional or alternative embodiments, other algorithms may be implemented. In one or more embodiments, the post classifier training dataset (126) may be used to train the post classifier ML model (112).

The threat intelligence computing system (110) further includes a tokenizer (113). The tokenizer (113) is operably and communicably coupled with the dark web analyzer (114) and the data repository (120). The tokenizer (113) is a collection of computer programs and code that includes functionality to tokenize preprocessed dark web posts, classified by the post classifier ML model (112) as "relevant." In one or more embodiments, the tokenizer (113) may be a programmatic implementation of a transformed pointwise mutual information model (T-PMI). The T-PMI model is described herein.

As a general overview, the pointwise mutual information (PMI) model is a term-weighting approach used to calculate the statistical significance of co-occurring words in a natural language corpus. PMI is used in natural language processing and information retrieval systems. Standard PMI is calculated using the formula of Equation (1):

$$PMI(w_1, w_2) = \log_2\left(\frac{P(w_1, w_2)}{P(w_1) \times P(w_2)}\right) \tag{1}$$

In Equation (1), $w_1$ and $w_2$ are co-occurring words, $P(w_1)$ and $P(w_2)$ represent the probabilities of individual words and $P(w_1, w_2)$ represents a joint probability of both words.

The transformed PMI model is an unsupervised dimensionality reduction and clustering method that aims to learn a lower-dimensional representation of word co-occurrence data in a natural language corpus. Compared to the standard PMI model, the T-PMI model further reduces spurious correlations between words and identifies latent trends with improved accuracy. The T-PMI model may be used in conjunction with the attack utterances dictionary (128) to calculate the probability of co-occurrences of words in the context provided by the attack utterance dictionary. The T-PMI formula used to calculate the probability of a word ($w_4$) in the context of preceding words ($w_1$, $w_2$, $w_3$) and the attack utterances dictionary (128) is given by Equation (2):

$$Transformed\ PMI\ (w_1, w_2, w_3, w_4) = \tag{2}$$
$$\log_{10}\left(\frac{P(w_4 \mid w_1, w_2, w_3, Attack\_Dictionary)}{P(w_4)}\right)$$

In Equation (2), $P(w_4 \mid w_1, w_2, w_3, Attack\_Dictionary)$ represents the probability of the current word $w_4$, given the context of the preceding words ($w_1$, $w_2$, $w_3$) and the Attack_Dictionary. The numerator of the $\log_{10}$ function is the conditional probability of the current word $w_4$, given the context, taking into consideration the commonly occurring attack phrases or words found in the attack utterances dictionary (128). Calculating the conditional probability identifies the frequency that $w_4$ appears in the context of the Attack_Dictionary, as well as the preceding words $w_1$, $w_2$, and $w_3$. $P(w_4)$ represents the probability of the current word $w_4$ appearing in a post. This is the marginal probability of the current word $w_4$, irrespective of context. The $\log_{10}$ function is applied to the ratio of the conditional probability of the current word given the context and the marginal probability of the current word. Applying the $\log_{10}$ function to the probability ratio of Equation (2) compresses the range of probability values and eases comparison across probability values. The tokenizer (113) and the operation of the T-PMI model are described in further detail in reference to the method of FIG. 4.

Continuing with FIG. 1, the threat intelligence computing system (110) further includes a dark web analyzer (114). The dark web analyzer (114) is a collection of computer programs and code that includes the functionality to orchestrate the execution of the preprocessor (111), the post classifier ML model (112), the tokenizer (113), and the threat analyzer LLM (116).

In one or more embodiments, the dark web analyzer may orchestrate the execution of the aforementioned components in a workflow of creating a catalog of annotated and categorized dark web posts. The dark web analyzer (114), in addition to the aforementioned components, is operably and communicably coupled with the data repository (120). Additionally, in one or more embodiments, the dark web analyzer (114) may perform prompt engineering for prompting the threat analyzer LLM (116). The dark web analyzer (114) further includes a threat analyzer LLM agent (115). As a general overview, an LLM agent is a collection of programs and code that uses an LLM as a central computational engine. LLM agents programmatically interact with LLMs with the help of various tools and application programming interfaces (API). In one or more embodiments, the threat analyzer LLM agent (115) may be configured to use the threat analyzer LLM (116) as a central computational engine. Thus, the threat analyzer agent (115) may be configured to serve as an LLM proxy to the dark web analyzer (114).

The threat intelligence computing system (110) further includes a threat analyzer LLM (116). The threat analyzer LLM (116) is operably and communicably coupled with the dark web analyzer (114) and the data repository (120). In one or more embodiments, the threat analyzer LLM (116) may be a commercially available LLM, for example, ChatGPT® from OpenAI, Llama®, Claude®, Mistral-7B, etc. In other embodiments, the threat analyzer LLM (116) may be a custom built LLM, including a foundation model and additional customizing implementation. Foundation models are large artificial intelligence (AI) models trained on broad data, serving as base models for generative AI systems such as LLMs.

Preprocessing dark web posts to a form that is understandable by an LLM, as well as constructing one or more prompts for the LLM as described herein causes the LLM to generate an annotated dark web post and a corresponding threat persona category. The annotated dark web post and corresponding threat persona category are further stored in the post-persona catalog (134) in the data repository (120). The post-persona catalog stores multiple annotated dark web posts and corresponding threat persona categories. The post-persona catalog (134) is used by a threat activity tracker (117) in the threat intelligence computing system (110).

In one or more embodiments, the threat activity tracker (117) may be an enterprise application executing on the threat intelligence computing system (110) that presents a threat dashboard. The threat dashboard may show one or more visualizations of threat activity trends, etc. via a web interface (118), potentially to cyber threat intelligence teams of an enterprise. In one or more embodiments, the threat activity tracker (117) may determine a threat persona's interest in enterprise owned sensitive data, customer information, etc., by way of trend analysis, to identify emerging threats.

While FIG. 1 shows a configuration of components, other configurations may be used without departing from the scope of one or more embodiments. For example, various components may be combined to create a single component. As another example, the functionality performed by a single component may be performed by two or more components.

Figure 2:
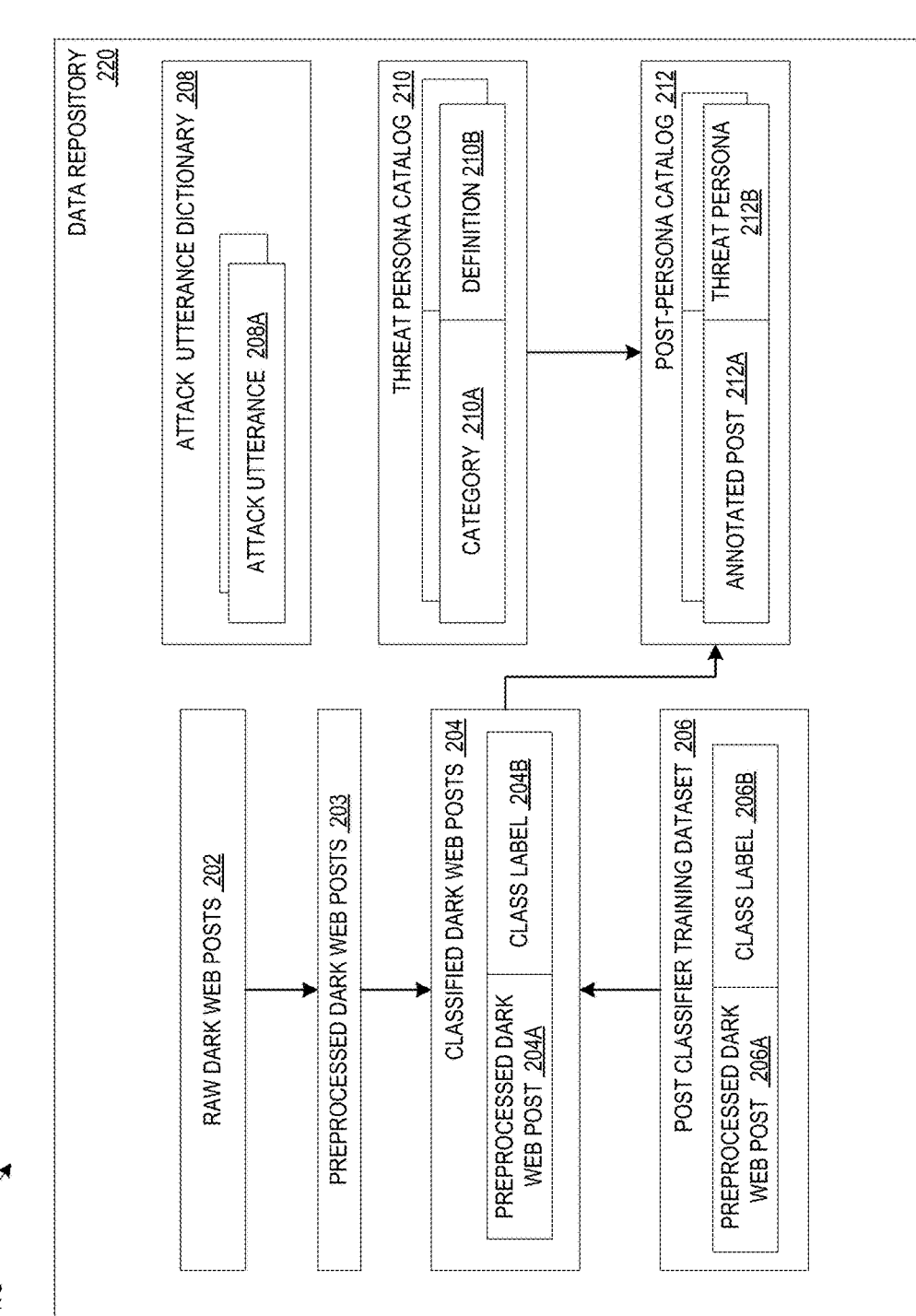
FIG. 2 shows a block diagram of data structures and dataflows, in accordance with one or more embodiments.

Turning now to FIG. 2, a detailed view of one or more data structures and data flows in the data repository is presented. The data repository (220) of FIG. 2 corresponds to the data repository (120) of FIG. 1. In a comparable manner, the raw dark web posts (202) correspond to the raw dark web posts (122) of FIG. 1, and the preprocessed dark web posts (203) correspond to the preprocessed dark web posts (123) of FIG. 1. Similarly, the classified dark web posts (204) correspond to the classified dark web posts (124) of FIG. 1, and the post classifier training dataset (206) corresponds to the post classifier training dataset (126) of FIG. 1. Continuing the analogy, the attack utterance dictionary (208) corresponds to the attack utterance dictionary (128) of FIG. 1, the threat persona catalog (210) corresponds to the threat persona catalog (132) of FIG. 1, and finally, the post-persona catalog (212) corresponds to the post-persona catalog (134) of FIG. 1. Each of these components is described herein.

In one or more embodiments, the raw dark web posts (202) may be obtained from the one or more dark web post collector(s) 102, from FIG. 1. In various embodiments, the raw dark web posts may be stored in diverse data structures and data stores, for example, lists, records, data frames, etc.

In one or more embodiments, the preprocessed dark web posts (203) may be a preprocessed version of the raw dark web posts (202), having undergone at least one operation of translation, stop word removal, noise (non-alphanumeric character) removal, etc. Further, the classified dark web posts (204) may include one or more preprocessed dark web posts (203), shown as preprocessed dark web post (204A) that are then related to a class. The preprocessed dark web post (204A) is additionally classified with a corresponding output class label, as shown in the block labeled "class label" (204B). The class label identifies an output class, for example "relevant" or "not relevant." In one or more embodiments, the classified dark web posts (204) may be stored as data frames.

In an equivalent manner, the post classifier training dataset (206) includes multiple preprocessed dark web posts corresponding to the preprocessed dark web posts (203), shown as preprocessed dark web posts (206A) and corresponding class label(s) (206B). In one or more embodiments, the corresponding class label(s) (206B) may be individually manually assigned to the preprocessed dark web post(s) (206A) to create the post classifier training dataset (206). The post classifier training dataset (206) may be used to train the post classifier ML model (112) of FIG. 1 to classify the preprocessed dark web posts (203), resulting in the creation of multiple classified dark web posts (204). The post classifier training dataset (206) may be considered to have multiple features. Features are attributes of data, which characterize the data. For example, customer data may have features such as name, address, credit card number, etc. In natural language data, features may include word counts of frequently occurring words to characterize the context, or domain, to which the natural language data pertains. For example, natural language data having frequently occurring words such as "finance," "banking," "balance," or "checking" may have word counts, or frequencies corresponding to these words as the "features" of the data. Further, the frequencies/word counts of these words may be indicative of the domain, or context of the data.

The attack utterance dictionary (208) includes multiple attack utterances (208A). The multiple attack utterances (208A) are obtained manually from classified dark web posts (204) classified as relevant. In one or more embodiments, the multiple attack utterances (208A) may be selected based on their exemplification of dark web post language that is considered definitive or commonly used for performing attacks in a particular domain, for example, financial technology (fintech), government cyber-espionage, etc. The attack utterances (208A) are selected to provide context around predicted words. The attack utterance dictionary (208) is used by the tokenizer (113) to identify and focus on those words that co-occur more frequently in attacks of the domain of interest, for example, fintech. For example, an attack utterance may be "Cracking program for bank accounts available." Further examples of the attack utterance dictionary (208) are presented in FIG. 5.

The threat persona catalog (210) includes multiple threat persona definitions. In one or more embodiments, a threat persona definition may include a category (210A) and a definition (210B), as shown in FIG. 2. The category (210A) of a threat persona is an identifier, or moniker of the threat persona. The definition (210B) of the threat persona may include one or more natural language utterances describing definitive behavioral traits of the threat persona. For example, the category of a threat persona may be "Harvester," and the definition of the threat persona may be "A threat actor who only wants to steal login credentials, from users by using fake login pages or landing pages." Further examples of threat persona definitions are presented in FIG. 5.

The data repository (220) includes a post-persona catalog (212). In one or more embodiments, the post-persona catalog (212) may include multiple annotated post(s) (212A) and corresponding threat persona(s) (212B). In one or more embodiments, the annotated post (212A) is a post summary of a corresponding classified dark web post (204A) processed by the threat analyzer LLM (116) to categorize the particular classified dark web post with a corresponding threat persona and generate the post summary. Additionally, the annotated post (212A) may also include a rationale or explanation generated by the threat analyzer LLM (116) of the categorization of the particular classified dark web post with the particular threat persona. In one or more embodiments, the post-persona catalog (212) may serve as a dataset for the threat activity tracker (117) for trend analysis and other actionable insights.

FIG. 3 shows a flowchart 300 of a method for categorizing a dark web post, in accordance with one or more embodiments. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined, or omitted, and at least some of the steps may be executed in parallel. Furthermore, the steps may be performed actively or passively.

The flowchart 300 begins at Block 302. In Block 302, multiple raw dark web posts are obtained. Each raw dark web post of the multiple raw dark web posts includes a natural language utterance. In one or more embodiments, the dark web analyzer may obtain the multiple raw dark web posts from the data repository.

At Block 304, the raw dark web posts are preprocessed to obtain a tokenized dark web post set. In one or more embodiments, the preprocessing step of Block 304 may be implemented by the method shown in FIG. 4, described in further detail in reference to FIG. 4. In one or more embodiments, a tokenized dark web post may be obtained from the tokenizer. The tokenizer may receive, as input, a preprocessed dark web post from the preprocessor. The tokenizer may further process the preprocessed dark web post to output a set of T-PMI tokens. The set of T-PMI tokens constitutes a tokenized dark web post. An example of a set of T-PMI tokens generated for a preprocessed dark web post is shown in FIG. 5.

At Block 306, a prompt is constructed for the threat analyzer LLM. The prompt includes at least an instruction, a first tokenized dark web post of the tokenized dark web post set and a set of threat personas. Each threat persona of the set of threat personas includes a category and a definition. The instruction directs the threat analyzer LLM to categorize the first dark web post with a threat persona of the set of threat personas and generate a first explanation corresponding to the categorization of the first dark web post. In one or more embodiments, the set of threat personas may be obtained from the threat persona catalog in the data repository by the dark web analyzer. Further, the prompt may be programmatically sent to the threat analyzer LLM via the threat analyzer LLM agent of the dark web analyzer.

At Block 308, the prompt is processed by the threat analyzer LLM, to obtain a first annotated post and a corresponding first threat persona category, the first threat persona category corresponding to a first threat persona. The first annotated post includes a post summary corresponding to the first tokenized dark web post and the first explanation. The post summary is the preprocessed version of the raw dark web post, namely, the post contents after undergoing translation, stop words removal and noise removal. The first explanation is based on a first threat persona definition of the first threat persona. An example of the categorization of a tokenized dark web post and a corresponding first explanation is shown in FIG. 5.

At Block 310, the first annotated post and corresponding first threat persona category are added to the post-persona catalog in the data repository. In one or more embodiments, Blocks 306-310 may be iterated over the tokenized dark web post set. Further, multiple raw dark web posts obtained from the data repository may be processed in accordance with the steps of Blocks 304-310. The method of FIG. 3 results in the creation of the post-persona catalog including multiple annotated posts and corresponding threat persona categories.

In one or more embodiments, the method of FIG. 3 may execute as one or more background processes in the threat intelligence computing system. The background process(es) may execute continuously, processing raw dark web posts as the dark web posts are received from the dark web post collector(s) and ingested into the data repository. In other embodiments, the background process(es) may execute on a periodic basis, e.g., daily, or weekly.

In one or more embodiments, the post-persona catalog may be used as a dataset by the threat activity tracker to present trend analysis visualizations of threat personas to one or more users via the web interface, for example, a cyber threat intelligence team or organization within the enterprise. In one or more embodiments, the threat activity tracker may select multiple annotated posts from the post-persona catalog corresponding to a threat persona to obtain a post-persona subset. The threat activity tracker may display to a user, via the web interface, a dashboard including content from the post-persona subset corresponding to the threat persona. The dashboard may include diverse visualizations of the annotated posts. As an example, a graph visualization may show multiple enterprise applications with which the particular threat persona is associated and the frequency of the annotated posts corresponding to the particular threat persona over a time period.

Continuing with the example, if a particular threat persona selected is the Harvester category, the graph may show that there was an increased number of posts corresponding to the Harvester category three months previously, related to two enterprise applications. The increase in post activity of the Harvester category may indicate that there may have been security gaps in the particular two enterprise applications that were taken advantage of by threat actors to harvest user credentials. Further continuing with the example, in the present day there may be an uptick of dark web posts corresponding to a takeover (TKO) persona. This may indicate that the user credentials stolen three months previously are now being utilized for account take over purposes.

Thus, periodic changes in activity of diverse threat personas may expose the threat actor's intent and actions, presenting a narrative of events to a cyber threat intelligence team. The narrative of events may further engender forecasting of future activity and insights on mitigation of the threat activity. Other visualizations showing diverse insights may be presented via the web interface to a user.

Turning now to FIG. 4, a method for preprocessing raw dark web posts to obtain tokenized dark web posts is presented in flowchart 400. The method of FIG. 4 expands on Block 304 of FIG. 3. The method of FIG. 4 may be implemented using the system of FIG. 1 and one or more of the steps may be performed on or received at one or more computer processors. While the various steps in the flowchart 400 are presented and described sequentially, at least some of the steps may be executed in different orders, may be combined, or omitted, and at least some of the steps may be executed in parallel. Furthermore, the steps may be performed actively or passively.

The flowchart 400 begins at Block 402. In Block 402, a set of preprocessing operations is performed on each of the raw dark web posts of the multiple raw dark web posts to obtain multiple preprocessed dark web posts. In one or more embodiments, the set of preprocessing operations may include translation, stop word removal, and noise removal. In one or more embodiments, the raw dark web posts may be obtained from the data repository. Further, the preprocessor of FIG. 1 may perform the preprocessing operations on the raw dark web posts. Translation may entail translating the raw dark web posts from different natural languages into the language used by the threat analyzer LLM. For example, raw dark web posts in Russian may be translated into English. The preprocessing operations may further entail stop word removal from the translated posts. Stop words refer to the most frequently used words (for example, articles, connecting words, etc.) in a natural language that hold insignificant value in text analysis. These words may be removed to speed up processing without losing crucial information. Additionally, noise removal operations may be performed on the raw dark web posts. In or more embodiments, noise removal may entail the removal of non-natural language characters and symbols and other noise characters from the posts. Furthermore, a frequency analysis may be performed on the words in the preprocessed dark web post corpus. The frequency analysis may identify additional words in the preprocessed dark web post corpus that are not significant to text modeling of the preprocessed dark web post corpus. The multiple preprocessed dark web posts may be stored in the data repository.

The step of Block 404 ascertains that the post classifier ML model is trained. If the post classifier ML model is not trained, the steps of Block 406 and 408 are performed. If the post classifier ML model is trained, then the step of Block 410 is performed. In one or more embodiments, Blocks 404, 406, and 408 may be implemented as part of a separate method for training the post classifier ML model and omitted from the method of FIG. 4.

At Block 406, a set of preprocessed dark web posts is classified into relevant and non-relevant classes to obtain a post classifier training dataset. In one or more embodiments, the classification of a preprocessed dark web post may entail manual reading and comprehension of the preprocessed dark web post. Further, based on the perceived intent of the preprocessed dark web post, the post may be classified as relevant or non-relevant. For example, for an enterprise in the financial technology industry, relevant dark web posts may profess an intent for adversarial action in financial domains, such as banking, taxes, stocks, and securities trading, etc. Non-relevant posts may profess intents for other domains, such as illegal drugs or weapons trading. The post classifier training data set includes multiple preprocessed dark web posts and corresponding multiple class labels identifying the class of the preprocessed dark web post, for example, "relevant" and "non-relevant."

At Block 408, the post classifier ML model of FIG. 1 is trained using the post classifier training dataset obtained in Block 406 to classify preprocessed dark web posts into relevant and non-relevant classes. In one embodiment, the post classifier ML model of FIG. 1 may be a Gaussian Naïve Bayes (GNB) model. The post classifier ML model classifies a set of input instances (a set of preprocessed dark web posts) into a set of output classes (relevant class and non-relevant class) identified by class labels ("relevant" and "non-relevant").

As a general overview, machine learning models based on probabilistic algorithms such as the Gaussian Naïve Bayes algorithm are probabilistic models. The Gaussian Naïve Bayes (GNB) algorithm assumes that features of input data follow a Gaussian (normal) distribution. Diverse Gaussian distributions of the features of the input instances may indicate diverse output classes of the input instances. Thus, the GNB algorithm is suitable for continuous features (real-valued data). Further, the GNB algorithm assumes that features are independent (naïve).

In training a GNB model with a training dataset including a previously classified set of input instances, a set of prior probabilities corresponding to each output class is computed for the training dataset as the probability of the occurrence of each output class in the training dataset. For example, if 35% of the input instances in the post classifier training dataset are classified as relevant, then the probability of the occurrence of the "relevant" output class is considered to be 0.35.

Further, the mean and standard deviation for each feature of the input data is estimated to obtain a Gaussian distribution corresponding to each class of a set of output classes. Thus, with respect to a particular output class, the Gaussian distribution for the output class is a set of Gaussian distributions corresponding to each feature of the input data, representing the statistical behavior of each feature within that output class. Further, with respect to a particular feature of the input data, the feature has a Gaussian distribution corresponding to each output class. By way of an example, if there are ten features in the input data, and five output classes for each feature, the mean and standard deviation of each feature in the input data is calculated to obtain a Gaussian distribution for each output class, resulting in fifty (10×5) Gaussian distributions. The fifty Gaussian distributions may be conceptually divided into five groups of ten Gaussian distributions corresponding to each feature, each group corresponding to an output class. Each group of ten Gaussian distributions represents a "feature profile" of an output class.

An input instance from a training dataset is obtained, having a set of feature values corresponding to the features of the input data. A set of feature value probabilities is calculated for the input instance, based on a Gaussian probability density function. The probability of a feature value is the probability of the occurrence of the feature value within the relevant context, i.e., the set of output classes. The set of feature value probabilities is compared to the Gaussian distributions corresponding to each output class of the set of output classes. A set of posterior probabilities with respect to the input instance is determined for each output class, by applying the Bayes theorem to the set of feature value probabilities of the input instance. The set of posterior probabilities of the feature values of the input instance represents the likelihood that the input instance belongs to a particular output class, given the input instance's observed feature values.

The set of posterior probabilities and the set of prior probabilities are used to calculate a combined probability of an output class as a product of the posterior probability of the input instance with respect to the output class and the prior probability of the output class. The prior probability represents an initial expectation about the likelihood of each class prior to observing any evidence (i.e., the input features). In other words, the prior probability reflects the overall distribution of classes in the dataset. The posterior probability represents an expectation about the likelihood of the input instance belonging to each class, based on the observed evidence (the input features). The product of the prior probability and posterior probability for each output class yields the unnormalized probability of a particular output class, given the input instance. The unnormalized probability provides for comparison of the relative likelihoods of different output classes for the input instance. A normalization step (dividing by the sum of unnormalized probabilities for all classes) ensures that the probabilities sum to 1.

Thus, a set of combined probabilities of output classes with respect to the input instance is obtained. The output class having the highest combined probability value is set as the predicted class for the input instance and the class label identifying the output class is assigned to the input instance. The remaining training dataset instances are processed by the GNB model in an equivalent manner.

Further, an evaluation dataset including classified input instances hitherto unseen by the model (also known as testing dataset) may be processed by the GNB model. The output of the GNB model may be evaluated (predicted class versus pre-defined or actual class) using metrics such as accuracy, precision, recall, and F1-score.

Accordingly, in Block 408, training the GNB may be performed as follows. The term "class label" is representative of the output class. The post classifier ML model is trained with the post classifier training dataset obtained from the data repository. In one or more embodiments, the post classifier ML model may be a Gaussian Naïve Bayes model. The post classifier training dataset may include multiple preprocessed dark web posts, classified with multiple class labels. A prior probability for each class label may be calculated as the probability of an occurrence of each class label in the post classifier training dataset. Multiple prior probabilities corresponding respectively to the multiple class labels may be thus obtained. Further, a mean and a standard deviation corresponding to each feature of multiple features, corresponding to the post classifier training dataset may be calculated, to obtain multiple Gaussian distributions of the multiple features corresponding to each class label of the multiple class labels. In other words, a Gaussian distribution for each feature corresponding to each class label may be obtained, for a total number of Gaussian distributions equaling the number of features multiplied with the number of class labels. Further, a first instance of the training set having multiple feature values corresponding to the multiple features of the post classifier training dataset may be obtained. A probability of each feature value of the multiple feature values of the first instance corresponding to each class label of the multiple class labels may be calculated. The calculated probability may be based on a Gaussian probability density function. Multiple feature value probabilities corresponding to each class label of multiple class labels may be obtained for the first instance. A Bayes theorem function may be applied to multiple feature value probabilities corresponding to each class label of the multiple class labels, for the first instance, to obtain multiple posterior probabilities corresponding respectively to the multiple class labels for the first instance. A combined probability value may be calculated as a product of a posterior probability value and a prior probability value, for each class label of the multiple class labels. Multiple combined probability values corresponding respectively to the multiple class labels are thus obtained, for the first instance. A class label from the multiple class labels with a highest combined probability value for the first instance is selected as a predicted class for the first instance.

Continuing with the flowchart 400, in Block 410, the preprocessed dark web posts are classified by the trained post classifier ML model into one of a relevant class and a non-relevant class to obtain corresponding classified dark web posts. The classified dark web posts are further stored in the data repository. In Block 412, multiple classified dark web posts classified as relevant are selected from the data repository.

In Block 414, a determination is made if the attack utterances dictionary is created. If the attack utterances dictionary is not created, the step(s) of Blocks 416 may be performed. If the attack utterances dictionary is created, the step(s) of Block 418 may be performed.

The attack utterances dictionary includes utterances having common phrases and sentences used in adversarial posts corresponding to a particular domain, for example, financial technology, healthcare, illegal weapons trafficking, etc. The common phrases may be referred to as frequently occurring phrases. In one or more embodiments, a frequency analysis of the classified dark web posts may be performed to identify frequently occurring phrases from the classified dark web posts. For example, a phrase occurring within the classified dark web posts with an occurrence above a phrase frequency threshold may be identified as a frequently occurring phrase. An utterance having at least one frequently occurring phrase may be selected to be included in the attack utterance dictionary. Multiple utterances may be selected in an equivalent manner to create the attack utterances dictionary. Notably, the frequency analysis may be performed specifically on the classified dark web posts classified as relevant. Context around predicted words from the attack utterances dictionary is used by the tokenizer to identify and focus on domain-specific word co-occurrences for accurate identification of threat personas exhibited by threat actors.

In Block 416, an attack utterances dictionary is created, including multiple utterances, each utterance having at least one frequently occurring phrase identified from the multiple classified dark web posts, the occurrence of the at least one frequently occurring phrase being higher than a phrase frequency threshold. In one or more embodiments, the dark web analyzer may create the attack utterances dictionary.

In Block 418, the classified dark web posts are tokenized, based on a transformed pointwise mutual information function using the attack utterances dictionary to obtain a corresponding set of tokenized dark web posts. In one or more embodiments, the tokenizer may tokenize the classified dark web posts. The transformed pointwise mutual information function may be implemented in accordance with Equations (1) and (2). The formula of Equation (2) quantifies how much information a current word ($w_4$ in the formula) provides, given the context of the preceding words and the attack utterances dictionary. The formula is calculated by comparing the probability of the current word appearing in the context of the attack utterances dictionary to the probability of the current word appearing in a corpus without regard to context. For a specific word $w_4$, every possible combination of the preceding words ($w_1$, $w_2$, and $w_3$) is iterated through to determine the likelihood of the presence of $w_4$ given the context and the attack utterances dictionary. By evaluating the formula of Equation (2) for each word in the classified dark web posts classified as relevant, high-risk adversarial keywords and phrases specific to a domain may be identified with high accuracy, minimizing false-positive predictions.

Dark web posts by threat actors are characterized by the usage of repeating words and non-meaningful words to mislead dark web crawlers and natural language processing algorithms. Accordingly, in one or more embodiments, the number of co-occurring words may be set as four (4), to accurately identify high-risk adversarial keywords and phrases and reduce unnecessary processing of irrelevant data.

FIG. 5 shows examples of an attack utterances dictionary, a tokenized dark web post, prompt construction for categorizing a tokenized dark web post, and an LLM-generated answer, in accordance with one or more embodiments. The following example is for explanatory purposes only and not intended to limit the scope of one or more embodiments. An attack utterances dictionary (502) includes multiple utterances selected from classified dark web posts pertaining to the financial technology domain. The frequent occurrence of the words "finance," "fintech," "bank," and the context, including "available," "stolen," indicate the financial technology domain and the nature of the actions of the attacks. A prompt (504) is constructed with instructions, threat persona definitions and a tokenized post for a threat analyzer LLM. The prompt (504) provides an instruction and explanation of the tokenized data (PMI results). Additionally, the threat persona categories and definitions obtained from the threat persona catalog are provided. The tokenized dark web post (506) generated as an output of the tokenizer is also shown. A sequence of sets of co-occurring words is shown. The tokenized dark web post (506) may be provided as the "structure T-PMI" shown in the text of the prompt (504). The LLM generated answer (508) shows an example answer generated by the threat analyzer LLM. The answer includes a threat persona category "Exploits Seller" corresponding to the tokenized dark web post (506). Additionally, an explanation of the reasoning behind assigning the particular threat persona category is provided.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
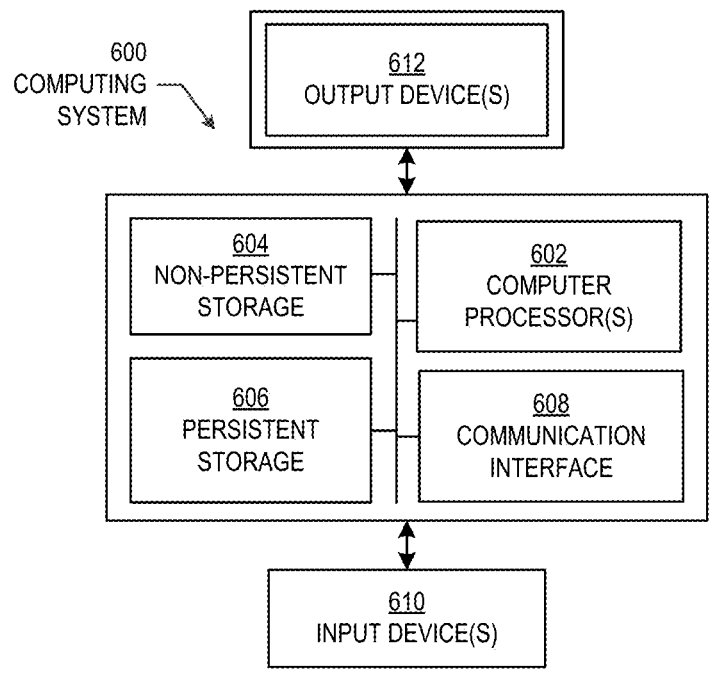
FIG. 6A and FIG. 6B show the block diagram of a computer system in a networked environment, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graph-ics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an inte-grated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many diverse types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclo-sure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiv-ing, presenting, and displaying data and messages described in the other figures of the disclosure.

Figure 6B:
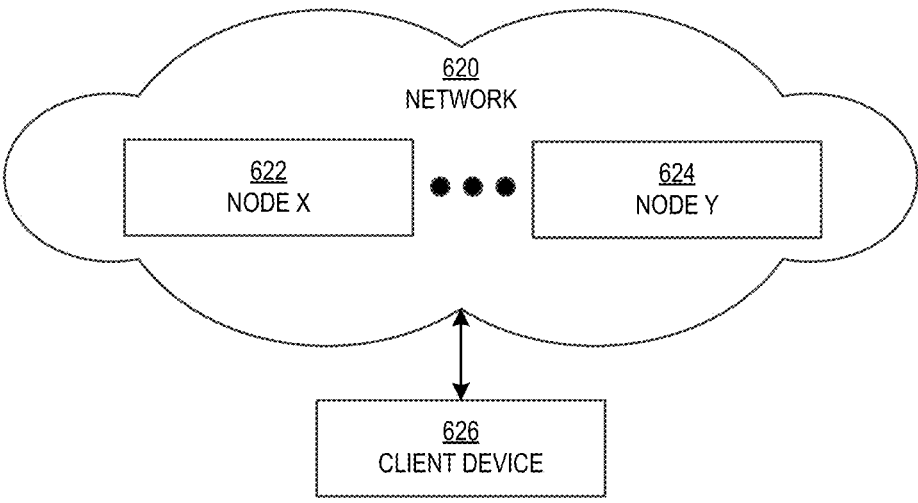

The computing system (600) in FIG. 6A may be con-nected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed com-puting system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a com-puting system, such as the computing system shown in FIG. 6A. Further, the client device (626) may include or perform all or a portion of one or more embodiments.

The computing system of FIG. 6A may include function-ality to present data (including raw data, processed data, and combinations thereof) such as results of comparisons and other processing. For example, presenting data may be accomplished through various presenting methods. Specifi-cally, data may be presented by being displayed in a user interface, transmitted to a different computing system, and stored. The user interface may include a graphical user interface (GUI) that displays information on a display device. The GUI may include various GUI widgets that organize what data is shown, as well as how data is pre-sented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the ele-ments, nor to limit any element to being only a single element unless expressly disclosed, such as by the use of the terms "before," "after," "single," and other such terminol-ogy. Rather, ordinal numbers distinguish between the ele-ments. By way of an example, a first element is distinct from a second element, and the first element may encompass more than one element and succeed (or precede) the second element in an ordering of elements.

Further, unless expressly stated otherwise, the conjunc-tion "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnec-essarily complicating the description. Further, other embodi-ments not explicitly described above can be devised which do not depart from the scope of the claims as disclosed herein. Accordingly, the scope should be limited only by the attached claims.

What is claimed is:

1. A method comprising:

obtaining a plurality of raw dark web posts, each raw dark web post of the plurality of raw dark web posts including a natural language utterance;

preprocessing the plurality of raw dark web posts to obtain a tokenized dark web post set;

constructing a prompt for a threat analyzer large language model (LLM), including at least a first tokenized dark web post of the tokenized dark web post set, a set of threat personas, each threat persona of the set of threat personas comprising a category and a definition, and an instruction to categorize the first tokenized dark web post with a threat persona of the set of threat personas and generate a first explanation corresponding to the categorization of the first tokenized dark web post;

processing the prompt with the threat analyzer LLM, to obtain a first annotated post and a corresponding first threat persona category, wherein the first annotated post includes a post summary corresponding to the first tokenized dark web post, and the first explanation, wherein the first explanation is based on a first threat persona definition; and adding the first annotated post and the corresponding first threat persona category to a post-persona catalog in a data repository.

2. The method of claim 1, further comprising:

selecting, by a threat activity tracker, from the post-persona catalog, a set of annotated posts corresponding to a second threat persona category to obtain a post-persona subset; and presenting, by the threat activity tracker, via a web interface, a dashboard displaying at least one visualization of the post-persona subset to a user.

3. The method of claim 1, wherein preprocessing of the plurality of raw dark web posts further comprises:

performing a set of preprocessing operations on each raw dark web post of the plurality of raw dark web posts to obtain a corresponding plurality of preprocessed dark web posts, wherein the set of preprocessing operations includes translation, stop word removal, and noise removal;

storing the plurality of preprocessed dark web posts in the data repository;

classifying a subset of the plurality of preprocessed dark web posts, wherein each preprocessed dark web post of the subset of preprocessed dark web posts is classified into one of a relevant class and a non-relevant class, to obtain a post classifier training dataset; and storing the post classifier training dataset in the data repository.

4. The method of claim 1, wherein preprocessing of the plurality of raw dark web posts further comprises:

training a post classifier ML model with a post classifier training dataset obtained from the data repository, to obtain a trained post classifier ML model, wherein the post classifier ML model is a Gaussian Naïve Bayes (GNB) model, and wherein the post classifier training dataset includes a plurality of preprocessed dark web posts classified with a plurality of class labels, the training comprising:

calculating a prior probability for each class label of the plurality of class labels, wherein the prior probability of each class label is the probability of an occurrence of each class label in the post classifier training dataset, to obtain a plurality of prior probabilities corresponding respectively to the plurality of class labels; and calculating a mean and a standard deviation corresponding to each feature of a plurality of features corresponding to the post classifier training dataset, to obtain a plurality of Gaussian distributions of the plurality of features, corresponding to each class label of the plurality of class labels.

5. The method of claim 4, further comprising:

obtaining a first instance of the post classifier training dataset having a plurality of feature values corresponding to the plurality of features of the post classifier training dataset;

calculating a probability of each feature value of the plurality of feature values of the first instance corresponding to each class label of the plurality of class labels, based on a Gaussian probability density function, to obtain a plurality of feature value probabilities corresponding to each class label of the plurality of class labels, for the first instance;

applying a Bayes theorem function to the plurality of feature value probabilities corresponding to each class label of the plurality of class labels, for the first instance, to obtain a plurality of posterior probabilities corresponding respectively to the plurality of class labels;

calculating a combined probability value as a product of a posterior probability value corresponding to each class label of the plurality of class labels and a prior probability value corresponding to each class label of the plurality of class labels, to obtain a plurality of combined probability values corresponding respectively to the plurality of class labels, for the first instance; and selecting a class label from the plurality of class labels with a highest posterior probability value for the first instance as a predicted class for the first instance.

6. The method of claim 1, wherein preprocessing of the plurality of raw dark web posts further comprises:

classifying each preprocessed dark web post of a plurality of preprocessed dark web posts obtained from the data repository, by a trained post classifier ML model into one of a relevant class and a non-relevant class, to obtain a corresponding plurality of classified dark web posts; and storing the plurality of classified dark web posts in the data repository.

7. The method of claim 1, wherein preprocessing of the plurality of raw dark web posts further comprises:

selecting a plurality of classified dark web posts from the data repository, wherein each classified dark web post of the plurality of classified dark web posts is classified into a relevant class; and creating an attack utterances dictionary comprising a plurality of utterances, each utterance of the plurality of utterances having at least one frequently occurring phrase identified from the selected plurality of classified dark web posts, wherein the occurrence of the frequently occurring phrase is higher than a phrase frequency threshold.

8. The method of claim 1, wherein preprocessing of the plurality of raw dark web posts further comprises:

selecting a plurality of classified dark web posts from the data repository, wherein each classified dark web post of the plurality of classified dark web posts is classified into a relevant class; and tokenizing the plurality of classified dark web posts by a tokenizer, based on a transformed pointwise mutual information function and an attack utterances dictionary, to obtain the tokenized dark web post set.

9. A system comprising:

at least one computer processor;

a data repository, in communication with the at least one computer processor and stored on a physical storage device, configured to store a plurality of raw dark web posts; and a dark web analyzer executing on the at least one computer processor, wherein:

the dark web analyzer is configured to cause the at least one computer processor to obtain the plurality of raw dark web posts, each raw dark web post of the plurality of raw dark web posts including a natural language utterance, cause a preprocessor executing on the at least one computer processor to preprocess the plurality of raw dark web posts to obtain a tokenized dark web post set, construct a prompt for a threat analyzer LLM, including at least a first tokenized dark web post of the tokenized dark web post set;

a set of threat personas, each threat persona of the set of threat personas comprising a category and a definition, and an instruction to categorize the first tokenized dark web post with a threat persona of the set of threat personas and generate a first explanation corresponding to the categorization of the first tokenized dark web post;

cause the threat analyzer LLM executing on the at least one computer processor to process the prompt, to obtain a first annotated post and a corresponding first threat persona category, wherein the first annotated post includes a post summary corresponding to the first tokenized dark web post, and the first explanation, wherein the first explanation is based on a first threat persona definition; and add the first annotated post and the corresponding first threat persona category to a post-persona catalog in the data repository.

10. The system of claim 9, further comprising:

a threat activity tracker, executing on the at least one computer processor, and configured to:

select, from the post-persona catalog, a set of annotated posts corresponding to a second threat persona category to obtain a post-persona subset; and present, via a web interface, a dashboard displaying at least one visualization of the post-persona subset to a user.

11. The system of claim 9, wherein the preprocessor is configured to:

perform a set of preprocessing operations on each raw dark web post of the plurality of raw dark web posts to obtain a corresponding plurality of preprocessed dark web posts, wherein the set of preprocessing operations includes translation, stop word removal, and noise removal;

store the plurality of preprocessed dark web posts in the data repository;

obtain a post classifier training dataset created by classifying a subset of the plurality of preprocessed dark web posts, wherein each preprocessed dark web post of the subset of preprocessed dark web posts is classified into one of a relevant class and a non-relevant class; and store the post classifier training dataset in the data repository.

12. The system of claim 9, wherein the dark web analyzer is further configured to:

train a post classifier ML model with a post classifier training dataset obtained from the data repository, to obtain a trained post classifier ML model, wherein the post classifier ML model is a Gaussian Naïve Bayes model, and wherein the post classifier training dataset includes a plurality of preprocessed dark web posts classified with a plurality of class labels, comprising:

calculating a prior probability for each class label of the plurality of class labels, wherein the prior probability of each class label is the probability of an occurrence of each class label in the post classifier training dataset, to obtain a plurality of prior probabilities corresponding respectively to the plurality of class labels; and calculating a mean and a standard deviation corresponding to each of a feature of a plurality of features corresponding to the post classifier training dataset, to obtain a plurality of Gaussian distributions of the plurality of features, corresponding to each class label of the plurality of class labels.

13. The system of claim 12, wherein the dark web analyzer is further configured to train the post classifier ML model, the training further comprising:

obtaining a first instance of the post classifier training dataset having a plurality of feature values corresponding to the plurality of features of the post classifier training dataset;

calculating a probability of each feature value of the plurality of feature values of the first instance corresponding to each class label of the plurality of class labels, based on a Gaussian probability density function, to obtain a plurality of feature value probabilities corresponding to each class label of the plurality of class labels, for the first instance;

applying a Bayes theorem function to the plurality of feature value probabilities corresponding to each class label of the plurality of class labels, for the first instance, to obtain a plurality of posterior probabilities corresponding respectively to the plurality of class labels for the first instance;

calculating a combined probability value as a product of a posterior probability value corresponding to each class label of the plurality of class labels and a prior probability value corresponding to each class label of the plurality of class labels, to obtain a plurality of combined probability values corresponding respectively to the plurality of class labels, for the first instance; and selecting a class label from the plurality of class labels with a highest posterior probability value for the first instance as a predicted class for the first instance.

14. The system of claim 9, wherein the dark web analyzer is further configured to:

cause a trained post classifier ML model executing on the at least one computer processor to classify each preprocessed dark web post of a plurality of preprocessed dark web posts obtained from the data repository, into one of a relevant class and a non-relevant class, to obtain a corresponding plurality of classified dark web posts; and store the plurality of classified dark web posts in the data repository.

15. The system of claim 9, wherein the dark web analyzer is further configured to:

select a plurality of classified dark web posts from the data repository, wherein each classified dark web post of the plurality of classified dark web posts is classified into a relevant class; and create an attack utterances dictionary comprising a plurality of utterances, each utterance of the plurality of utterances having at least one frequently occurring phrase identified from the selected plurality of classified dark web posts, wherein the occurrence of the frequently occurring phrase is higher than a phrase frequency threshold.

16. The system of claim 9, wherein the dark web analyzer is further configured to:

select a plurality of classified dark web posts from the data repository, wherein each classified dark web post of the plurality of classified dark web posts is classified into a relevant class; and cause a tokenizer executing on the at least one computer processor to tokenize the plurality of classified dark web posts, based on a transformed pointwise mutual information function and an attack utterances dictionary, to obtain the tokenized dark web post set.

17. A method, comprising:

obtaining, by a dark web analyzer, a plurality of raw dark web posts from a data repository on a physical storage device, each raw dark web post of the plurality of raw dark web posts including a natural language utterance;

performing, by a preprocessor, a set of preprocessing operations on each raw dark web post of the plurality of raw dark web posts to obtain a corresponding plurality of preprocessed dark web posts, wherein the set of preprocessing operations includes translation, stop word removal, and noise removal;

classifying a subset of the plurality of preprocessed dark web posts, wherein each preprocessed dark web post of the subset of preprocessed dark web posts is classified into one of a relevant class and a non-relevant class, to obtain a post classifier training dataset;

training, by the dark web analyzer, a post classifier ML model with the post classifier training dataset, to obtain a trained post classifier ML model, wherein the post classifier ML model is a Gaussian Naïve Bayes model; and classifying, by the trained post classifier ML model, each preprocessed dark web post of the plurality of preprocessed dark web posts, into one of the relevant class and the non-relevant class, to obtain a corresponding plurality of classified dark web posts.

18. The method of claim 17, further comprising:

selecting, by the dark web analyzer, a set of classified dark web posts from the plurality of classified dark web posts, wherein the set of classified dark web posts is classified into the relevant class;

creating an attack utterances dictionary comprising a plurality of utterances, each utterance of the plurality of utterances having at least one frequently occurring phrase identified from the set of classified dark web posts, wherein the occurrence of the frequently occurring phrase is higher than a phrase frequency threshold; and tokenizing, by a tokenizer, the set of classified dark web posts, based on a transformed pointwise mutual information function and the attack utterances dictionary, to obtain a tokenized dark web post set.

19. The method of claim 18, further comprising:

constructing, by the dark web analyzer, a prompt for a threat analyzer LLM, including at least a first tokenized dark web post of the tokenized dark web post set, a set of threat personas, each threat persona of the set of threat personas comprising a category and a definition, and an instruction to categorize the first tokenized dark web post with a threat persona of the set of threat personas and generate a first explanation corresponding to the categorization of the first tokenized dark web post;

processing the prompt with the threat analyzer LLM, to obtain a first annotated post and a corresponding first threat persona category, wherein the first annotated post includes a post summary corresponding to the first tokenized dark web post, and the first explanation, wherein the first explanation is based on a first threat persona definition; and adding, by the dark web analyzer, the first annotated post and the corresponding first threat persona category to a post-persona catalog in the data repository.

20. The method of claim 19, further comprising:

selecting, by a threat activity tracker, from the post-persona catalog, a set of annotated posts corresponding to a second threat persona category to obtain a post-persona subset; and presenting, by the threat activity tracker, via a web interface, a dashboard displaying at least one visualization of the post-persona subset to a user.

\* \* \* \* \*